United States Patent [19] [11] Patent Number: 5,590,246
Asgharzadeh et al. [45] Date of Patent: Dec. 31, 1996

[54] FUZZY LOGIC CONTROLLED VIDEO PRINTER

[75] Inventors: Ali Asgharzadeh; Mohammad Jamshidi, both of Albuquerque, N.M.

[73] Assignee: University of New Mexico, Albuquerque, N.M.

[21] Appl. No.: 290,232

[22] Filed: Aug. 15, 1994

[51] Int. Cl.$^6$ .................................................. G06K 15/00
[52] U.S. Cl. ............................... 395/109; 395/3; 395/900
[58] Field of Search ................................. 395/109, 101, 395/131, 3, 50, 80, 900, 22; 358/520, 504, 404, 296, 518, 501, 406, 523, 516; 382/167, 112, 274

[56] References Cited

U.S. PATENT DOCUMENTS

| | | | |
|---|---|---|---|
| 5,111,232 | 5/1992 | Tsunefuji | 354/402 |
| 5,146,323 | 9/1992 | Kobori et al. | 358/527 |
| 5,218,394 | 6/1993 | Useda et al. | 354/402 |
| 5,218,555 | 6/1993 | Komai et al. | 395/900 |
| 5,223,921 | 6/1993 | Haruki et al. | 395/900 |
| 5,231,452 | 7/1993 | Murayama et al. | 395/900 |
| 5,266,984 | 11/1993 | Muramatsu et al. | 354/432 |
| 5,295,077 | 3/1994 | Fukuoka | 358/479 |
| 5,296,945 | 3/1994 | Nishikawa et al. | 358/518 |
| 5,410,637 | 4/1995 | Kern et al. | 395/900 |

OTHER PUBLICATIONS

Zadeh, L. A., "Fuzzy Sets", *Information and Control*, vol. 8, pp. 338–353, 11965.

Zadeh, L. A., "Outline of a new approach to the analysis of complex system and decisions processes", *IEEE trans. on Sys. Man & Cyber.*, 3, pp. 28–44, 1973.

K. Akahoshi, "SLR Camera Using Fuzzy Logic in Autofocus, Autoexposure and Autozoom", *Proceedings of The Second Fuzzy Control and Intelligent Systems*, pp. 17–22, College Station.

K. Tanaka and M. Sugeno, "A Study on Subjective Evaluation of Printed Color Images", Int'l Jour. Approximate Reasoning, vol. 5, No. 3, pp. 213–222, 1991.

T. Shingu and E. Nishimori, "Fuzzy-based Automatic Focusing System for Compact Camera", 3rd IFSA Congress, pp. 436–439, 1989.

Primary Examiner—Edward L. Coles, Sr.
Assistant Examiner—Tracy M. Legree
Attorney, Agent, or Firm—Jeffrey D. Myers; Donovan F. Duggan

[57] ABSTRACT

A method and apparatus for generating high quality output from a video printer. For a given video printer, human experts generate a set of prints from a series of test images, other human experts score those prints, the results are stored in a database, and fuzzy control rules for the printer are developed from the database. The fuzzy rules are then incorporated in a fuzzy control system attached to the printer and its video input source.

12 Claims, 1 Drawing Sheet

FUZZY LOGIC CONTROLLED VIDEO PRINTER

BACKGROUND OF THE INVENTION

1. Field of the Invention (Technical Field)

The present invention relates to methods and apparatuses for improving quality of printouts produced by video printers.

2. Background Art

Fuzzy logic control systems have been introduced in a number of applications, including improving the quality of photographs. Recent patents in this area include U.S. Pat. No. 5,295,077, entitled "Digital Electronic Still Camera," to Fukuoka; U.S. Pat. No. 5,266,984, entitled "Exposure Calculating Apparatus for Camera," to Muramatsu et al.; U.S. Pat. No. 5,218,394, entitled "Automatic focusing Camera with Improved Determination of Operation Modes," to Ueda et al.; and U.S. Pat. No. 5,111,232, entitled "Camera Having Fuzzy Inference Function," to Tsunefuji.

Fuzzy logic control has not heretofore been applied to video printers or to the improvement of the output quality of video printers.

SUMMARY OF THE INVENTION (DISCLOSURE OF THE INVENTION)

The present invention comprises a video printer and a video printer control method comprising: sensing attributes of images output from a video source to a video printer; determining video printer output attribute settings based upon attributes sensed by said sensing means via fuzzy logic control comprising a plurality of IF-THEN rules; and setting output attribute settings of the video printer to the determined settings. In the preferred embodiment, determining comprises generating the plurality of IF-THEN rules by analysis of test prints generated by a first plurality of experts from a plurality of test video source images, the analysis comprising scoring on a scale of print quality by a second plurality of experts. Determining also preferably comprises determining video printer output settings for one or more of the following attributes: color, hue, brightness, contrast, and sharpness.

The present invention is also of a method for generating high quality output from a video printer, comprising: providing to a plurality of experts a plurality of digital images from a video source; for each of the plurality of digital images, receiving from the plurality of experts one or more prints from the video printer and corresponding one or more sets of video printer attribute settings; scoring each of the prints as to the quality of the print to generate a plurality of scores; for each print, storing in a database attributes of the corresponding digital image, the video printer attribute settings chosen which resulted in the print, and the score for the print; deriving fuzzy IF-THEN rules from the database; providing the IF-THEN rules to a fuzzy logic control system; receiving to the fuzzy logic control system video input to the video printer; and setting via the fuzzy logic control system attributes of the video printer output based upon attributes of the video input. In the preferred embodiment, scoring comprises scoring by a second plurality of experts distinct from the first plurality of experts providing the prints. Setting preferably comprises setting one or more of the following attributes: color, hue, brightness, contrast, and sharpness attributes of the video printer output.

A primary object of the present invention is to improve the quality of output of video printers.

Another object of the present invention is to increase the ease of use of video printers.

A primary advantage of the present invention is that once the fuzzy rules have been calculated and established for a particular video printer, no manual adjustment of printer attribute settings should be required.

Another advantage of the present invention is that a wide variety of printer attributes can be controlled, including color, hue, brightness, contrast, and sharpness.

Other objects, advantages and novel features, and further scope of applicability of the present invention will be set forth in part in the detailed description to follow, taken in conjunction with the accompanying drawing, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWING

The accompanying drawing, which is incorporated into and forms a part of the specification, illustrates an embodiment of the present invention and, together with the description, serves to explain the principles of the invention. The drawing is only for the purpose of illustrating a preferred embodiment of the invention and is not to be construed as limiting the invention. In the drawing.

Figure 1:
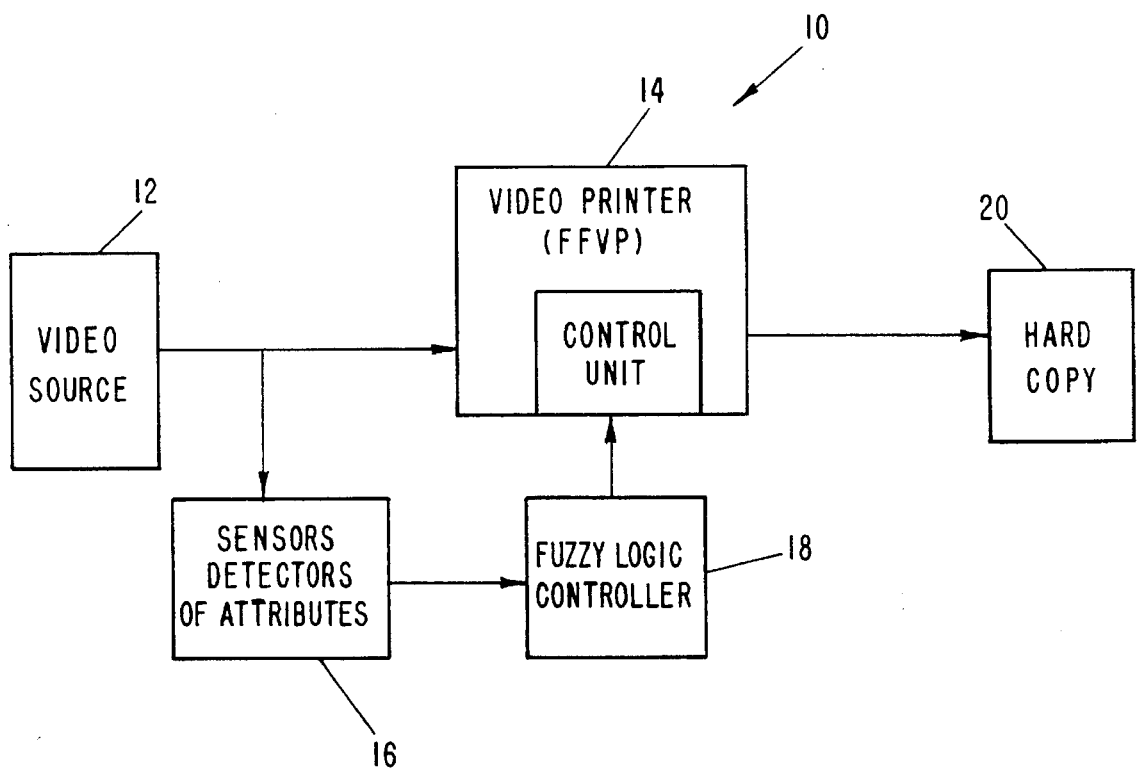
FIG. 1 is a block diagram of the preferred fuzzy controller and video printer of the invention.

DESCRIPTION OF THE PREFERRED EMBODIMENTS (BEST MODES FOR CARRYING OUT THE INVENTION)

The present invention is of a fuzzy logic rule based system capable of improving the quality of printed pictures from video images. This is achieved via fuzzy logic control of video image attributes such as color, sharpness, brightness and contrast in video printers. To develop the rule based system, a set of analyses are conducted to extract and record the knowledge of a group of experts. This is achieved by allowing each expert to produce a set of prints for each image in the test set. Each printed image is given a score (S) by human experts and then this result is stored in a database which consists of the corresponding video image attributes and video printer settings. From this database a set of fuzzy IF-THEN rules are derived to maximize the score S over a large set of printed pictures.

One of the main reasons why humans are included in modern complex systems of control and communication is because of their unique ability to make rational decisions in situations where there is some lack of information. In most problematic situations solved by humans there is vagueness and uncertainty of the concepts formed and fixed in the information knowledge base of the person that makes the decision. Fuzzy set theory and fuzzy logic have been proposed in order to provide some means for representing and manipulating imprecise and vagueness. Their relative simplicity, elegance and intuitive appeal have resulted in their application in a variety of fields. Zadeh, L. A., "Fuzzy Sets", *Information and Control* 8:338–53 (1965); Zadeh, L. A., "Outline of new approach to the analysis of complex systems and decisions process", *IEEE Trans. on Sys. Man. & Cyber.* 3:28–44 (1973).

Applications of fuzzy logic can be widely seen in consumer products such as temperature control of showers, air conditioner control, camcorders (T. Shingu and E. Nishimori, "Fuzzy-based Automatic Focusing System for Compact Camera," *3rd IFSA Congress* 436–39 (1989)), washing machines, vacuum cleaners, etc. There have been numerous studies of auto-focus, auto-exposure, auto-zooming (K. Akahoshi, "SLR Camera Using Fuzzy Logic in Autofocus, Autoexposure and Autozoom," *Proceedings of The Second Fuzzy Control and Intelligent Systems* pp. 17–22), and auto-white balancing in camcorders using fuzzy logic technology. The present invention applies fuzzy logic technology to the video printer.

Video printers as they exist today often require the user to adjust exposure, contrast, sharpness, and color balance to create a high quality print. This requires some degree of understanding about what makes a good image. It also means that the user is likely to make several prints before the user is satisfied with the results. It would be ideal to develop a system that is capable of making prints of very high quality the first time, with few, if any, adjustments by the user.

The preferred expert control system of the present invention employs fuzzy logic to accomplish the task of producing optimal print quality. Using fuzzy IF-THEN rules, each image that the user wishes to print is analyzed and the image characteristics are adjusted to optimize the print quality.

A fuzzy expert system controller typically takes the form of a set of IF-THEN rules whose antecedents and consequents are fuzzy sets with their respective membership functions. Consequents from different rules are numerically combined (typically union via MAX operation) and are then collapsed (typically taking the centroid of the combined distribution) to yield a single real number (crisp) output.

Within the framework of a fuzzy expert system, typical rules are usually the result of human operator's knowledge, e.g.:

IF brightness is Dark then increase brightness to Medium Bright level.

In this rule, Dark and Medium Bright are fuzzy variables (linguistic labels). Such natural language rules can then be translated into typical computer language type statements such as:

IF (X is $A_i$ and Y is $B_j$) then Z is $C_1$

Using a set of rules such as these, a finite number of rules can be derived in the form of natural language statements as if a human operator were performing the controlling task.

A video printer is a device that transfers a video image into some sort of output medium. This medium can be a slide film, 35 mm film, instant film, or the like. The general characteristics that are used to distinguish one color from another are brightness, hue and saturation. Brightness embodies the chromatic notion of intensity. Hue is an attribute associated with the dominant wavelength in a mixture of light waves. Therefore, hue represents dominant color perceived by an observer; when we call an object, red, orange or yellow we are specifying its hue. Saturation refers to relative purity of the amount of white light mixed with hue. In a video signal, sharpness is represented by the emphasis of the high frequency content.

Usually video printers are operated via a set of controls to improve the image quality. The operator has control over color intensity, hue, brightness, contrast, and sharpness of an image. An operator or consumer may adjust these qualities to obtain the desired improvements. This requires the knowledge of an expert in the field, and even with this knowledge the expert has to make at least a few prints to get the best results. Since the consumer is not an expert and does not have the knowledge of how these factors affect the system, there is a need for an expert system that will be able to improve the image quality so that most consumers would be satisfied with the print quality the first time a print is produced.

The preferred video printer for use in the present invention is the Freeze Frame Video Printer (FFVP). The expert system for controlling the printer is capable of determining the control settings and image attributes for the FFVP to obtain an optimal print quality.

The preferred system of the invention is a fuzzy logic rule based system that is capable of improving the quality of printed pictures without any adjustments from the user. The input to this system is a set of video signal attributes and the output is the set of modified control settings that improve printed picture quality. To improve the picture quality, the invention concentrates on five major attributes of a video signal: color, hue, brightness, contrast and sharpness.

FIG. 1 illustrates the structure of the preferred fuzzy logic controlled video printer 10. Video source 12 provides input to both video printer 14 and sensors/attribute detectors 16. Sensors/attribute detectors 16 provide input to fuzzy logic controller 18, which processes the input to generate attribute adjustment instructions to video printer 14. Upon receipt of input from both video source 12 and fuzzy logic controller 18, video printer 14 produces hard copy 20. Under normal circumstances, the human operator will not attempt any additional modifications to the video printer settings.

In order to collect the necessary data to produce an effective fuzzy logic controller, several human experts participate in analysis of a series of digital images from a video source. Each expert operates the printer (without the fuzzy controller) and adjusts the control settings of the five attributes according to the expert's understanding and preferences to obtain a print or a set of prints with different attribute settings. The expert performs this task for several different images.

A database is then formed that consists of the input attributes of the image and the corresponding video controller settings for the printed image generated by the experts. Each print is scored (S) by human experts, which score is then stored in the database. K. Tanaka and M. Sugeno, "A Study on Subjective Evaluation of Printed Color Images", *Int'l J. Approximate Reasoning* 5:3:213–22 (1991). As S increases the quality of the print increases and thus the cost function is reduced. A set of fuzzy rules are then derived from this database that will increase S over a large set of printed images.

The present invention provides a fuzzy rule based system that is capable of adjusting the video characteristics of a still image to obtain a high quality print. The invention does not require costly and time consuming image processing techniques and can be implemented in real time. Fuzzy logic provides a fast and low overhead method to obtain the attribute modifications required in video printer systems to produce quality prints.

The invention is further described in a paper by the inventors presented as the ISRAM Conference in Hi., on Sunday, Aug. 14, 1994, which paper is incorporated herein by reference.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A video printer control apparatus comprising:

means for sensing at least four attributes of images output from a video source to a video printer;

non-iterative fuzzy logic control means comprising a plurality of IF-THEN rules for altering video printer output attribute settings based upon attributes sensed by said sensing means; and means for setting output attribute settings of said video printer based upon results generated by said IF-THEN rules.

2. The apparatus of claim 1 wherein said fuzzy logic control means comprises a plurality of IF-THEN rules generated by analysis of test prints generated by a first plurality of experts from a plurality of test video source images.

3. The apparatus of claim 2 wherein said fuzzy logic control means comprises a plurality of IF-THEN rules generated by analysis of test prints generated by a first plurality of experts from a plurality of test video source images, said analysis comprising scoring on a scale of print quality by a second plurality of experts.

4. The apparatus of claim 1 wherein said fuzzy logic control means comprises a plurality of IF-THEN rules for altering video printer output settings for at least one attribute selected from the group consisting of color, hue, brightness, contrast, and sharpness.

5. A video printer control method comprising the steps of:

a) sensing at least four attributes of images output from a video source to a video printer;

b) non-iteratively determining video printer output attribute settings based upon attributes sensed by said sensing means via fuzzy logic control comprising a plurality of IF-THEN rules; and setting output attribute settings of the video printer to the determined settings.

6. The method of claim 5 wherein the determining step comprises generating the plurality of IF-THEN rules by analysis of test prints generated by a first plurality of experts from a plurality of test video source images.

7. The method of claim 6 wherein the determining step comprises generating the plurality of IF-THEN rules by analysis of test prints generated by a first plurality of experts from a plurality of test video source images, the analysis comprising scoring on a scale of print quality by a second plurality of experts.

8. The method of claim 5 wherein the determining step comprises determining video printer output settings for at least one attribute selected from the group consisting of color, hue, brightness, contrast, and sharpness.

9. A method for generating high quality output from a video printer, the method comprising the steps of:

a) providing to a plurality of experts a plurality of digital images from a video source;

b) for each of the plurality of digital images, receiving from the plurality of experts one or more prints from the video printer and corresponding one or more sets of video printer attribute settings;

c) scoring each of the prints as to the quality of the print to generate a plurality of scores;

d) for each print, storing in a database attributes of the corresponding digital image, the video printer attribute settings chosen which resulted in the print, and the score for the print;

e) deriving fuzzy IF-THEN rules from the database;

f) providing the IF-THEN rules to a fuzzy logic control system;

g) receiving to the fuzzy logic control system video input to the video printer; and h) setting via the fuzzy logic control system attributes of the video printer output based upon attributes of the video input.

10. The method of claim 9 wherein the scoring step comprises scoring by a second plurality of experts.

11. The method of claim 10 wherein the scoring step comprises scoring by a second plurality of experts distinct from the first plurality of experts of steps a) and b).

12. The method of claim 9 wherein the setting step comprises setting at least one attribute selected from the group consisting of color, hue, brightness, contrast, and sharpness attributes of the video printer output.

* * * * *